Sept. 2, 1924.
F. W. MERRILL
1,506,765
SYSTEM FOR CONTROLLING THE SPEED OF DYNAMO ELECTRIC MACHINERY
Filed May 17, 1921
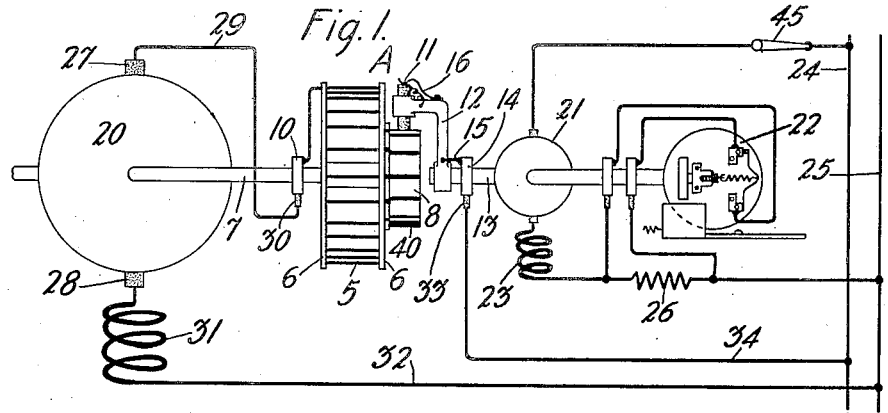
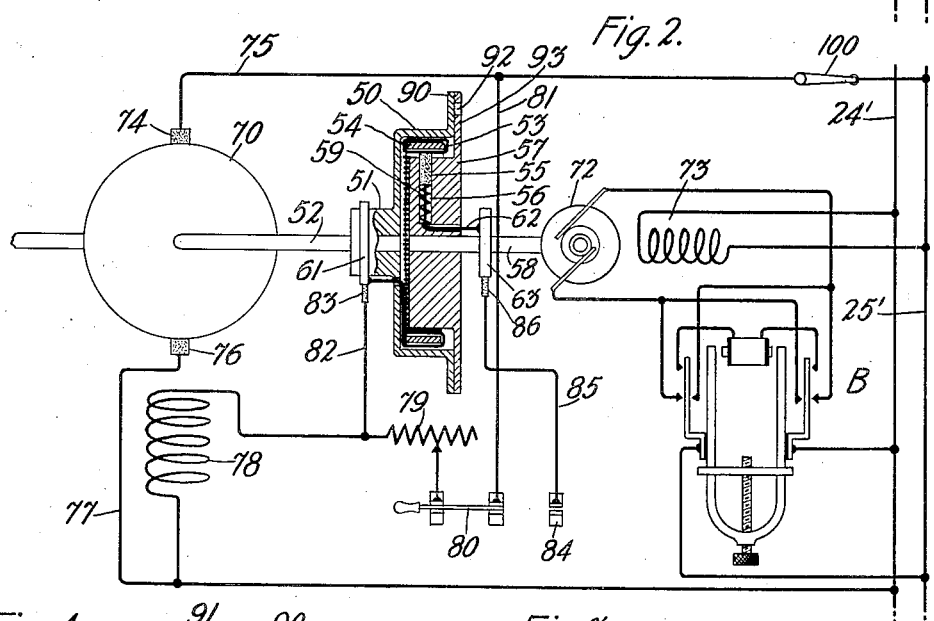
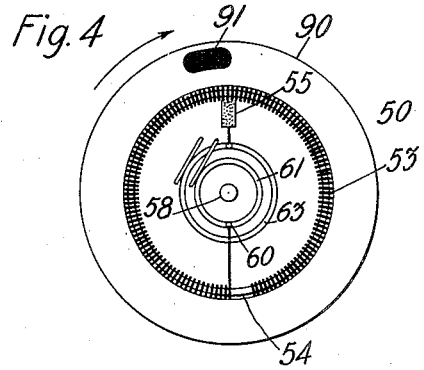
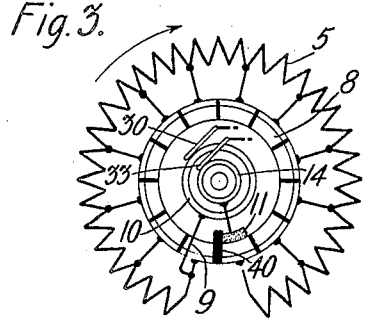
Inventor:
Frank W. Merrill
by Hubert A. Pattison
Atty.

Patented Sept. 2, 1924.

1,506,765

UNITED STATES PATENT OFFICE.

FRANK W. MERRILL, OF EAST ORANGE, NEW JERSEY, ASSIGNOR TO WESTERN ELECTRIC COMPANY, INCORPORATED, OF NEW YORK, N. Y., A CORPORATION OF NEW YORK.

SYSTEM FOR CONTROLLING THE SPEED OF DYNAMO-ELECTRIC MACHINERY.

Application filed May 17, 1921. Serial No. 470,474.

*To all whom it may concern:*

Be it known that I, FRANK W. MERRILL, a citizen of the United States, residing at East Orange, in the county of Essex and State of New Jersey, have invented certain new and useful Improvements in Systems for Controlling the Speed of Dynamo-Electric Machinery, of which the following is a full, clear, concise, and exact description.

This invention relates to improvements in systems for controlling the speed of dynamo electric machinery.

The primary object of the present invention is the provision of a control system which will maintain the speed of a dynamo electric machine constant although the load thereof is variable.

More specifically, the invention relates to speed control systems for dynamo electric machinery in which the current supplied the machine to be controlled is regulated by a variable impedance device consisting of two rotating elements which, in moving relative to each other, vary the value of the said impedance, one of said elements being driven at a constant set speed and the other by the machine to be controlled.

In the accompanying drawings which illustrate several embodiments of the invention, Fig. 1 is a schematic illustration of a speed control system embodying the invention, in which the speed of the dynamo electric machine to be controlled is both automatically set and maintained at the fixed speed.

Fig. 2 is a schematic illustration of a modified form of speed control system embodying the invention, in which the speed of the dynamo electric machine is manually set and automatically maintained at the fixed speed.

Fig. 3 is a schematic illustration showing the circuit of the variable impedance device employed with the system shown in Fig. 1.

Fig. 4 is a detailed view of the impedance element employed in the variable impedance mechanism used in the system shown in Fig. 2.

Referring now to the drawings in detail, in which like reference numerals designate similar parts throughout the several views, and directing attention first to the system shown in Fig. 1, the reference letter A indicates generally a variable impedance device of the type fully shown and described in my copending application, Serial No. 470,473, filed May 17, 1921, differing from the construction shown in said application in one particular which will be pointed out in detail hereinafter. Briefly, this device comprises an impedance wire 5 wound between parallel plates 6 rotatable with a shaft 7. Sections of the impedance wire 5 are connected with the segments of a commutator 8, also secured to the shaft 7, the ends of the wire 5 being connected to adjacent segments of the commutator 8, as is illustrated in Fig. 3, one of said ends being connected by a conductor 9 to a slip-ring 10 secured to the said shaft 7. Cooperating with the commutator 8 is a brush 11 carried by an L-shaped arm 12 secured to a second shaft 13, upon which is also mounted a slip-ring 14 which is electrically connected with the brush 11 by a conductor 15 and arm 12, a spring 16 serving to hold the brush 11 in engagement with the commutator 8.

The construction described above is identical with that shown in my copending application before mentioned. The present construction differs therefrom by omitting the image 58 on the plate 6, and in the provision of a stop 40, Fig. 3, constructed of insulating material and secured to the commutator, the said stop interposed in the path of the brush 11, the purpose of which will be hereinafter described.

As is shown in Fig. 1, the shaft 7 carrying the impedance element which in this instance comprises a resistance, is driven by the armature of a motor 20, the speed of which is to be regulated, while the brush carrying arm 12 is driven by a motor 21 which is kept at a constant speed by any suitable means, an adjustable speed regulator 22 of the type disclosed in patent to B. J. Merritt, No. 1,306,072, dated June 10, 1919, being shown used for this purpose. The motor 21 is of the series type and has its armature and field 23 connected in series through a switch 45 with supply mains 24 and 25, connected to any suitable source of direct current. The regulator 22 has a vibrating mechanism and when the contacts thereof are closed, completes a circuit shunting a resistance 26, this resistance being cut into the field and armature circuit of the motor 21 when the said contacts are separated. The varying of the current flow to the motor 21 through the above described means, controls its speed as is readily understood.

Cooperating with the armature of the motor 20 are brushes 27 and 28, the former being electrically connected with the slip-ring 10 by a conductor 29 and brush 30, while the latter is connected to the series field 31 which in turn is electrically connected to the supply main 25 by conductor 32. The brush 11 is connected to the other main 24 by a brush 33, and conductor 34.

When current is supplied the mains 24 and 25, the motor 20 will be set in operation over a circuit which may be traced from main 25, conductor 32, series field 31, brush 28, armature of motor 20, brush 27, conductor 29, brush 30, slip-ring 10, resistance wire 5, commutator 8, brush 11, arm 12, conductor 15, slip-ring 14, brush 33, conductor 34 to supply main 24. The switch 45 upon starting is open so that no current is supplied the motor 21. The motor 20 in operating rotates commutator 8 counter-clockwise, as viewed in Fig. 3, causing the stop 40 to engage the brush 11 and carry it around therewith, rotating the shaft 13 and armature of motor 21. With the parts in this position, it will be seen, by referring to Fig. 3, that all of the resistance wire 5 will be introduced in the field and armature circuit of the series motor 20 causing it to run at its slowest speed, as is readily understood. After the motor 20 has started, the switch 45 is closed, starting the motor 21. Since this motor operates at the speed determined, by regulator 22 which is always greater than the minimum speed of motor 20, it will run faster than motor 20, moving the brush 11 away from the stop 40 in a counter-clockwise direction, cutting some of the resistance 5 out of the circuit of the motor 20 and causing it to speed up and move the commutator and stop 40 nearer the brush 11. This relative movement continues until the speed of the motor 21 reaches a value as determined by the regulator 22 when the movement of the brush 11 relative to the commutator will cease. The movement of the commutator, relative to the brush, will continue, however, until the resistance 5 is regulated to a degree permitting the motor 20 and commutator 8 to rotate at the same speed as the brush 11, at which time the relative movement between the said brush and commutator will cease.

Should the motor 20 reduce in speed, due to an increase in load or other cause, the brush 11 will advance around the commutator 8 in a counterclockwise direction cutting more resistance out of the circuit supplying the motor 20 causing it to speed up sufficiently to bring it back in synchronism with the motor 21. Should the motor 20 attempt to speed up, the commutator 8 will move counterclockwise away from the brush 11 cutting more resistance into the field of the motor 20 and bringing it back in synchronism with the motor 21.

In the modified system shown in Fig. 2, a slightly different form of impedance device is employed, which comprises a cup-shaped member 50 constructed of insulating material having a hub portion 51 secured to a shaft 52. A continuous and exposed impedance wire 53 is wound upon a ring 54 constructed of insulating material which is suitably supported by the cup-shaped member 50. Cooperating with the inner side of the impedance 53 is a brush 55 reciprocably mounted within a radial passage 56 formed in a hub 57 constructed of insulating material and secured to a shaft 58. A spring 59 mounted within the passage 56 below the brush 55, serves to press it into engagement with the impedance wire 53. One end of the impedance wire 53 is led out through an opening 60 in the bottom wall of the cup-shaped member 50, and connected to a slip-ring 61 secured to the hub 51. The brush 55 is electrically connected by conductor 62 with a slip-ring 63, secured to the shaft 58.

In adapting the impedance mechanism above described to the system shown in Fig. 2, the motor 70, the speed of which is to be kept constant, is shown as directly connected to the shaft 52 so that the cup-shaped member 50 and impedance wire 53 carried thereby will be rotated at the same speed as the armature thereof. The shaft 58 carrying the hub 57 and brush 55 is driven by a motor 72, or other suitable device, the speed of which may be set and kept constant. The motor 72 is shown as being of the synchronous type, a usual form of tuning fork interrupter B being interposed in the armature circuit thereof, which interrupter and the shunt field 73 of the motor are supplied with current from mains 24' and 25' supplied with direct current from any suitable source. Since the tuning fork interrupter B is of the usual type, which is well-known to those skilled in the art, a detailed description thereof is not thought to be necessary.

One brush 74 cooperating with the armature of the motor 70 is connected to the main 25' by conductor 75 and switch 100, while the other brush 76 of the said motor is connected to the main 24' by the conductor 77. The motor 70 is illustrated as being of the shunt type, its field winding 78 having one end connected to the conductor 77 and its other end connected to the conductor 75 through the medium of a variable impedance 79, a double-throw knife switch 80 and conductor 81. The field winding 78 is also connected to the slip-ring 61 by means of a conductor 82 and brush 83, while the slip-ring 63 is electrically connected to an alternate contact 84 of the switch 80 by conductor 85 and brush 86.

In starting the system, the hand switch 80 is thrown to the position shown and the switch 100 closed, setting the motor 70 in operation, the armature circuit thereof extending from supply main 25', switch 100, conductor 75, brush 74, armature of motor 70, brush 76, conductor 77 to supply main 24'. The field circuit for the said motor may be traced from supply main 24', field 78, resistance 79, switch 80, conductors 81 and 75 to supply main 25'. The armature of motor 70 in revolving, turns the cup-shaped member 50 and the impedance wire 53 carried thereby, the friction between said wire and brush 55 being sufficient to cause the said brush, drum 57, shaft 58 and armature of motor 72 to be also rotated in a clockwise direction as viewed in Fig. 4, starting the motor 72 which, running without load, comes up to its fixed and constant speed as determined by the tuning fork interrupter B. By cutting more or less impedance 79 into the field 78 of the motor 70, the speed of the said motor may be regulated and brought into synchronism with the motor 72. A variety of different means may be employed for indicating when the motors 70 and 72 are operating in synchronism, the impedance device shown in Figs. 2 and 3 incorporating means for giving this indication stroboscopically. The cup-shaped member 50 is provided with an annular flange 90 having a spot 91 or image formed thereon, this annular flange thereby serving as the image member of a stroboscope. Lying adjacent the flange 90 is a flange 93 made integral with the hub 57, said flange being provided with an opening 92 through which image 91 formed on the flange 90 may be viewed when the said opening and image are brought into registration. The flange 93 serves as the shutter member of a stroboscope. Since the flange 90 is driven at the same speed as the motor 70, and the flange 93 is driven at the same speed as the motor 72, if these machines are not in synchronism, the image 91 will appear to move relative to the opening 92. By varying the impedance 79, as previously explained, the speed of the dynamo electric machine 70 may be varied until the image 91 appears to be stationary when viewed through the opening 92, indicating that the motors 70 and 72 are operating at the same speed. After the said motors have been brought into synchronism, the switch 80 may be thrown from the position in which it is illustrated to one in which it engages contact 84. With the switch in this position, the impedance 79 will be cut out and the impedance 53 connected in series with the field 78 of the motor 70. The field circuit may now be traced from the current main 24', field 78, conductor 82, brush 83, slip-ring 61, impedance 53, brush 55, conductor 62, slip-ring 63, brush 86, conductor 85, contact 84, switch 80, conductors 81 and 75 to current main 25'. As long as the machines 70 and 72 rotate at the same speed there will be no relative movement between the brush 55 and the impedance 53, and the amount of impedance cut into the field 78 will remain the same. If the dynamo electric machine 70 slows down, due to increased load, or other cause, the brush 55 will advance around the impedance 53 in a clockwise direction as viewed in Fig. 4, cutting more impedance into the field 78, reducing the current flow therein and causing the armature of the dynamo electric machine 70 to speed up an amount sufficient to bring it back in synchronism with the motor 72. Should the speed of the dynamo electric machine 70 increase above the synchronized speed, the impedance 53 will advance clockwise relative to the brush 55, cutting some of the impedance out of the field circuit, permitting a larger flow of current therein and causing the armature of the dynamo electric machine 70 to slow down an amount sufficient to bring it back into synchronism with the motor 72.

What is claimed is:

1. In a system for regulating the speed of a dynamo electric machine, a variable impedance device for controlling the current supply to the field of said machine, said impedance device comprising two rotary elements, one rotatable by the dynamo electric machine, the speed of which is to be regulated, and the other rotatable at a constant speed and means whereby one of said elements may be rotated by the other.

2. In a system for regulating the speed of a dynamo electric machine, a regulator comprising a movable impedance element and a movable member cooperating therewith, said elements arranged whereby a movement of one relative to the other varies the value of said impedance element, one of said elements being actuated by the dynamo electric machine, the speed of which is to be regulated, and the other actuated at a constant speed and means whereby one of said elements may be rotated by the other.

3. In a system for regulating the speed of a dynamo electric machine, a variable impedance device for controlling the current supply for actuating said dynamo electric machine, said impedance device comprising an impedance, a commutator, the segments thereof being connected to sections of said impedance and a brush engaging said commutator, said commutator being rotated by the dynamo electric machine, and means for rotating said brush and means whereby said brush may be rotated by said commutator.

4. In a system for regulating the speed of a dynamo electric machine, a variable rotatable impedance device for controlling the current supply for actuating said dynamo electric machine, said impedance device comprising an impedance, a commutator secured to said impedance, the segments thereof being connected to sections of said impedance and a brush engaging said commutator, said commutator being rotated by the dynamo electric machine, the speed of which is to be regulated, and means carried by said commutator for engaging said brush whereby the latter may be rotated by the former.

5. In a system for regulating the speed of a dynamo electric machine, a variable impedance device comprising two rotary elements, one of said elements rotatable by the dynamo electric machine, and the other rotatable at a constant speed, and means whereby one of said elements is rotatable by the other.

6. In a system for regulating the speed of a dynamo electric machine, a variable impedance device comprising two rotatable elements, one rotatable by the dynamo electric machine and the other rotatable by means independent of the dynamo electric machine, and means whereby either of said elements may be rotated by the other.

In witness whereof, I hereunto subscribe my name this 13th day of May, A. D., 1921.

FRANK W. MERRILL.